United States Patent [19]
Wu

[11] Patent Number: 6,125,097
[45] Date of Patent: Sep. 26, 2000

[54] SHOCK ABSORBING DEVICE OF CD-ROM READING MECHANISM

[75] Inventor: Cheng-Ying Wu, Taipei, Taiwan

[73] Assignee: Behavior Tech Computer Corp., Taipei, Taiwan

[21] Appl. No.: 09/186,423

[22] Filed: Nov. 5, 1998

[51] Int. Cl.[7] .................................................. G11B 33/08
[52] U.S. Cl. ............................................................ 369/263
[58] Field of Search ...................................... 369/247, 248, 369/263

[56] References Cited

U.S. PATENT DOCUMENTS

| | | | |
|---|---|---|---|
| 4,932,019 | 6/1990 | Bessho | 369/247 |
| 5,182,738 | 1/1993 | Yoshikawa | 369/44.14 |
| 5,668,791 | 9/1997 | Yamada et al. | 369/247 |
| 5,732,063 | 3/1998 | Chen | 369/263 |
| 5,737,304 | 4/1998 | Soga et al. | 369/247 |
| 5,875,168 | 2/1999 | Ogusu et al. | 369/247 |
| 5,956,314 | 9/1999 | Ishimatsu et al. | 369/247 |

FOREIGN PATENT DOCUMENTS 567833  11/1993  European Pat. Off. ............... 369/263

*Primary Examiner*—Brian E. Miller
*Attorney, Agent, or Firm*—Rosenberg, Klein & Lee

[57] ABSTRACT

A shock absorbing device adapted to be incorporated in a reading mechanism of a CD-ROM having a driving motor of a substantial weight arranged at a first end side of the reading mechanism, includes a base frame defining therein an interior space for receiving and holding the reading mechanism therein. A plurality of shock absorbing elements, made of a resilient material, are arranged between the reading mechanism and support members that are fixed inside the interior space of the base frame for absorbing vibration/shock caused by the operation of the CD-ROM. At least one counterweight plate is attached to the reading mechanism at a second end side thereof to be opposite to the driving motor in order to balance the weight of the motor.

6 Claims, 5 Drawing Sheets

SHOCK ABSORBING DEVICE OF CD-ROM READING MECHANISM

BACKGROUND OF THE INVENTION

1. Field of the Invention

The present invention relates generally to a device for reducing or absorbing vibration or shock occurring during the operation of the reader head in reading data from for example a compact disc in a CD-ROM and in particular to a shock absorbing device which comprises counterweight means to provide a more balanced distribution of weight in the reading mechanism so as to reduce the shock and vibration caused by the operation of the moving parts of the reading mechanism.

2. Related Arts

CD-ROMs have been widely used in computer systems as mass data storage. The CD-ROMs comprise an optic reader device which has a reader head movable inside the CD-ROM to be positionable with respect to a compact disc for accessing data on the compact disc. To correctly read data, the positioning of the reader head has to be precise so that vibration and/shock occurring during the operation of the reader head has to be alleviated or even eliminated.

A conventional design of the reading mechanism of the CD-ROMs which is used to move the reader head is illustrated in FIG. 6 of the attached drawings. The conventional reading mechanism comprises a driving motor A for coupling to and driving the compact disc and the driving motor A is usually mounted at one end side of the reading mechanism. A reader head B is guided by two opposite guide rails C and C' to be movable with respect to a compact disc received in the CD-ROM.

In the conventional design, the reading mechanism is directly fixed to the CD-ROM by means of for example bolts or screws. No means for buffering vibration or absorbing shock caused in the operation of the reading mechanism is provided so that the vibration or shock so caused may negatively affect the positioning and/or reading operation of the reader head B.

Further, in the conventional design, the driving motor A has to be arranged at one end side of the reading mechanism which causes an imbalance distribution of weight in the reading mechanism for most of the remaining parts of the reading mechanism is made of light-weighted materials for the sake of reducing cost. When the reader head B is moved in the direction toward the driving motor A, the weight imbalance problem may become more serious and vibration or shock caused thereby may be more significant.

To solve such problems, a variety of techniques have been developed, such as Taiwan patent publication No. 307003 which discloses a compensation circuit for reducing negative effect caused by the vibration and/or shock. However, such a circuit is useless in correcting problem caused by imbalance of weight.

It is thus desirable to provide a shock absorbing device adapted to be incorporated in a CD-ROM reading mechanism to both effectively absorb vibration/shock and provide a more balanced weight distribution in the reading mechanism.

SUMMARY OF THE INVENTION

Thus, a principal object of the present invention is to provide a shock absorbing device to be incorporated into a CD-ROM reading mechanism for absorbing vibration/shock caused in the operation of the CD-ROM so as to improve positioning/reading precision of the CD-ROM reader head.

Another object of the present invention is to provide a shock absorbing device to be incorporated into a CD-ROM reading mechanism which comprises a counterweight attached to the CD-ROM reading mechanism in such a way to substantially eliminate the weight imbalance caused by the driving motor which drives the compact disc and thus reducing the likelihood of vibration caused by the imbalance of weight.

In accordance with the present invention, to achieve the above objects, there is provided a shock absorbing device adapted to be incorporated in a reading mechanism of a CD-ROM having a driving motor of a substantial weight arranged at a first end side of the reading mechanism. The shock absorbing device comprises a base frame defining therein an interior space for receiving and holding the reading mechanism therein. A plurality of shock absorbing elements, made of a resilient material, are arranged between the reading mechanism and support members that are fixed inside the interior space of the base frame for absorbing vibration/shock caused by the operation of the CD-ROM. At least one counterweight plate is attached to the reading mechanism at a second end side thereof to be opposite to the driving motor in order to balance the weight of the motor.

BRIEF DESCRIPTION OF THE DRAWINGS

The present invention will be better understood from the following description of a preferred embodiment thereof with reference to the attached drawings, wherein.

DETAILED DESCRIPTION OF THE PREFERRED EMBODIMENT

Figure 6:
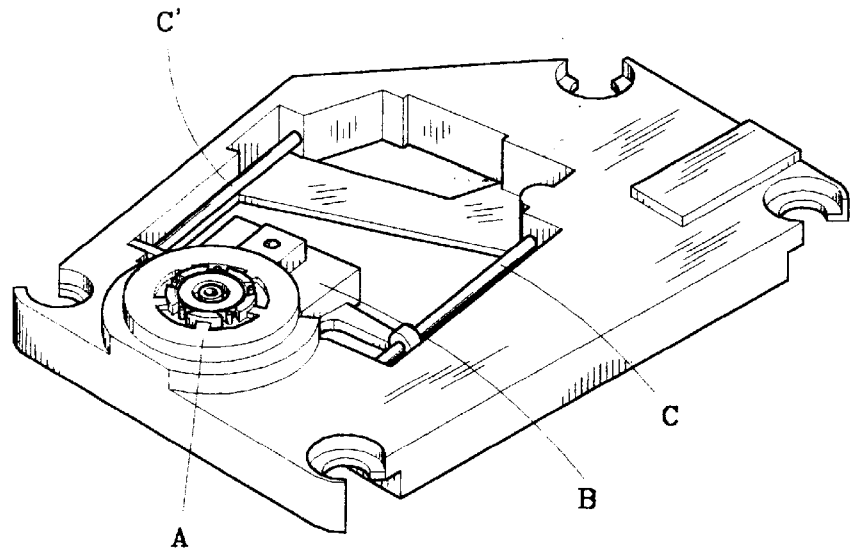
FIG. 6 is a perspective view of a conventional CD-ROM reading mechanism.
Figure 1:
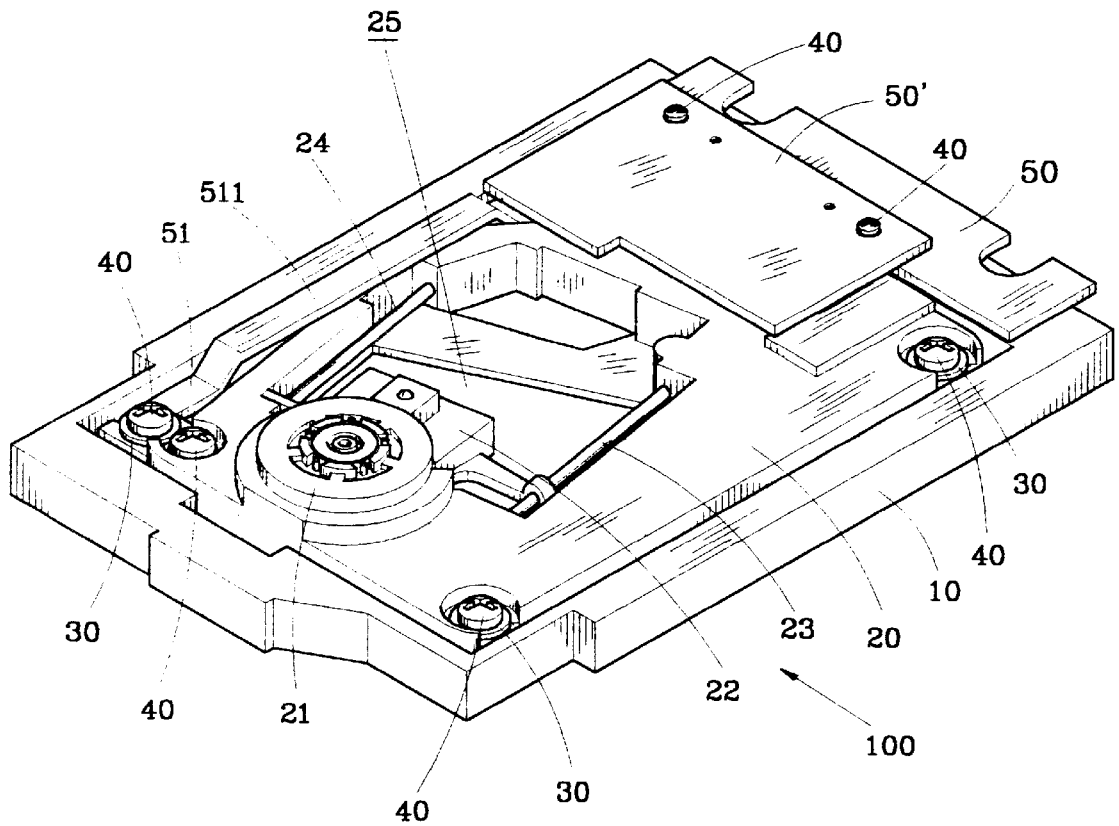
FIG. 1 is a perspective view showing a CD-ROM reading mechanism in which a shock absorbing device in accordance with the present invention is incorporated.

With reference to the drawings and in particular to FIGS. 1–4, wherein a CD-ROM reading mechanism is shown, into which a shock absorbing device in accordance with the present invention, generally designated with reference numeral 100, is incorporated, the shock absorbing device 100 of the present invention comprises a base frame 10 adapted to be fixed inside a CD-ROM (not shown), the base frame 10 comprises an interior space surrounded by circumferential wall adapted to receive therein an optic reader device 20 of the CD-ROM reading mechanism. The interior space of the base frame 10 comprises a plurality of support tabs 11 each having at least one threaded hole 12 for receiving and engaging bolts 40 that secures the optic reader device 20 to the base frame 10.

The optic reader device 20 comprises a body sized to be received and held in the interior space of the base frame 10. A driving motor 21 is fixed to the body in the proximity of one end of the body. The body of the optic reader device 20 comprises a cavity 25 inside which two guide rails 23 and 24 are arranged to be opposite to each other. A reader head 22 which is adapted to read data or information from for example a compact disk (not shown) received in the CD-ROM is movable inside the cavity 25 by being guided by the guide rails 23 and 24 for performing the data reading operation.

Figure 2:
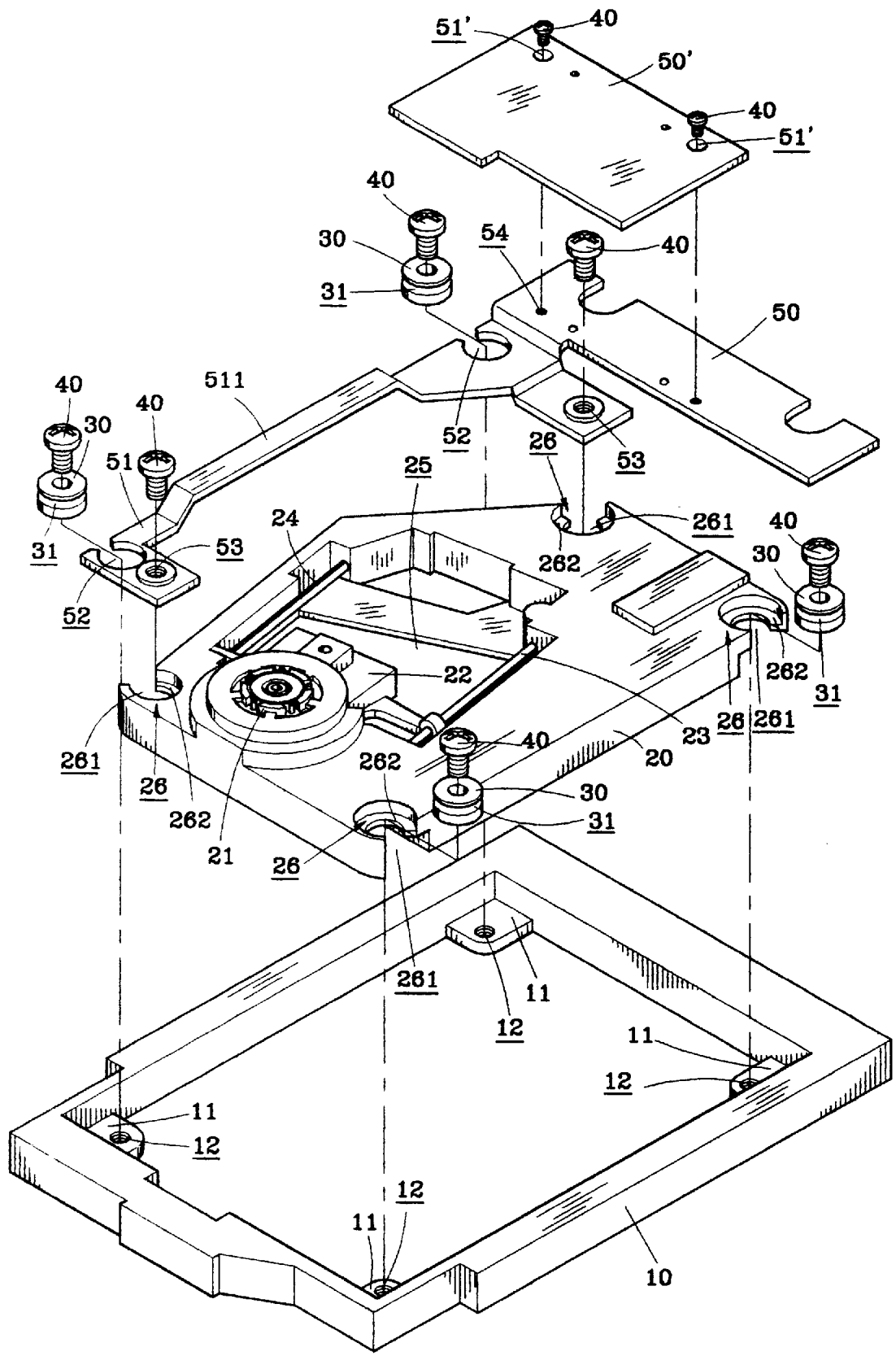
FIG. 2 is an exploded perspective view of the CD-ROM reading mechanism comprising the shock absorbing device of the present invention.
Figure 3:
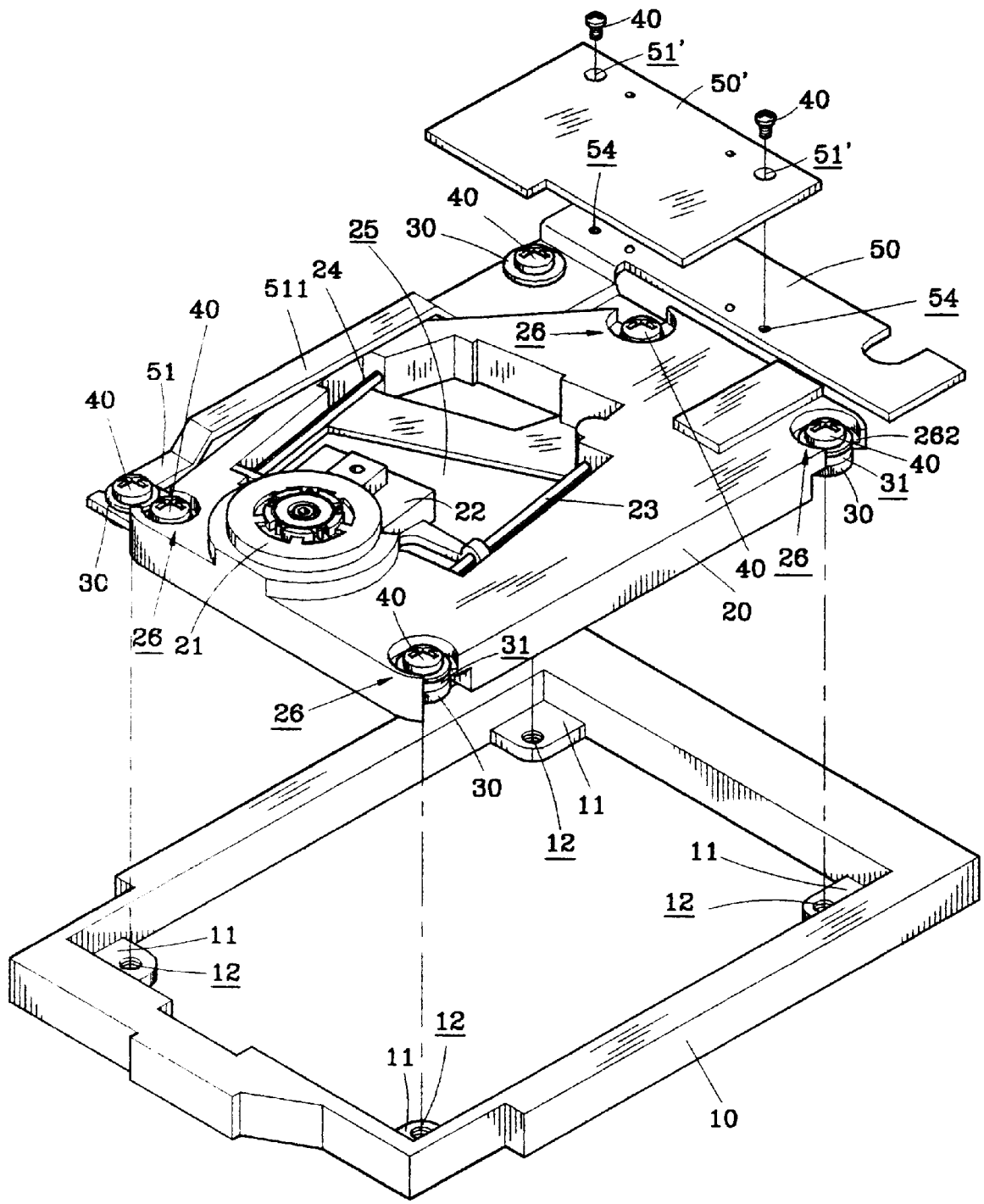
FIG. 3 is an exploded perspective view of the CD-ROM reading mechanism showing a primary counterweight plate of the shock absorbing device secured to the CD-ROM reading mechanism.
Figure 4:
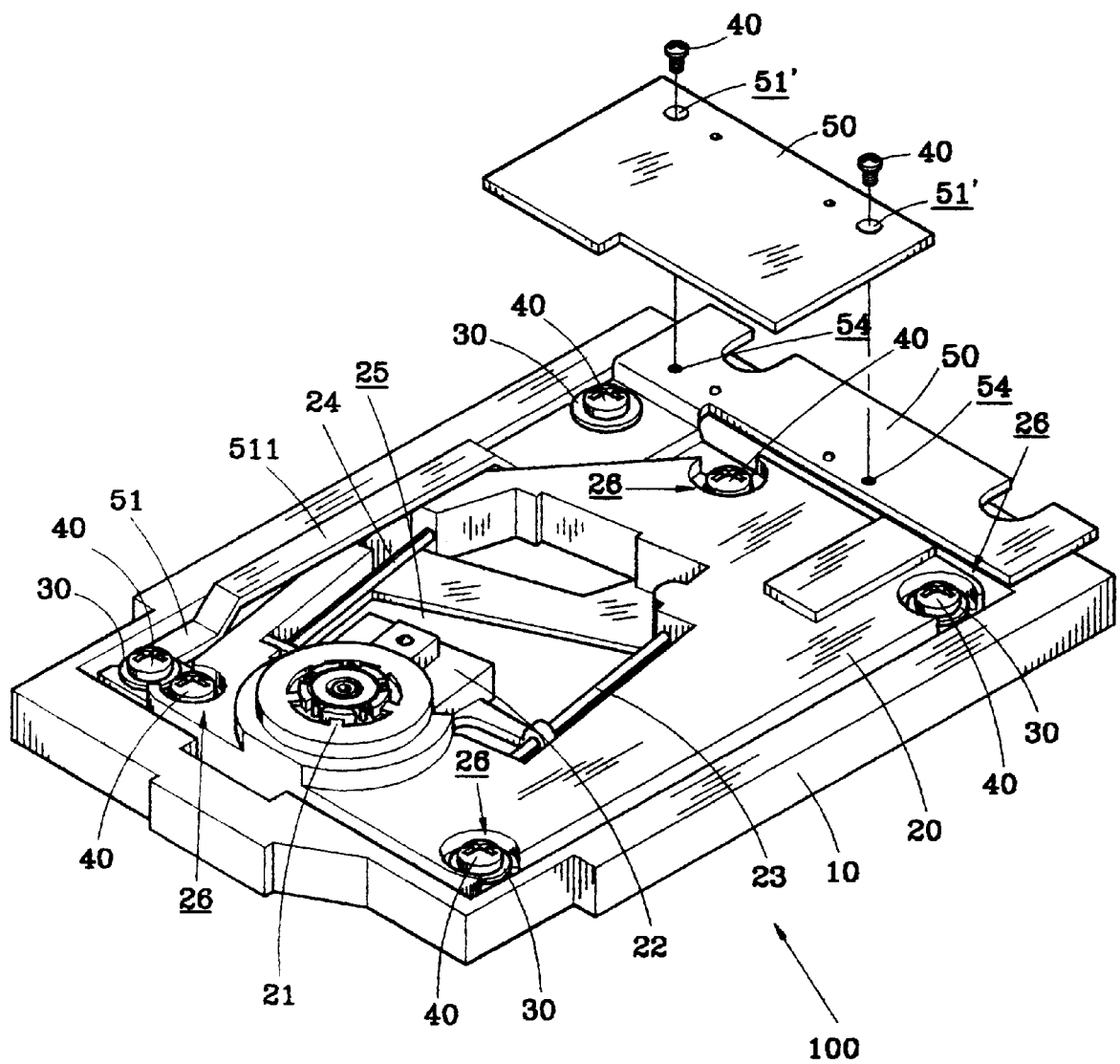
FIG. 4 is an exploded perspective view showing the CD-ROM reading mechanism secured to the base frame.

The body of the optic reader device 20 comprises a plurality of mounting holes 26. Preferably the mounting holes 26 are of a C-shaped configuration, namely having a side opening 261 as shown in FIG. 2. Each of the mounting holes 26 has an inner flange 262 extending circumferentially along inside surface of the hole 26.

At least some of the mounting holes 26 of the optic reader device 20 comprise a shock absorbing element 30 fit therein. The shock absorbing element 30 is made of a resilient material in the form of a short cylinder having a circumferential slot 31 to be fit into the mounting hole 26 of the optic reader device 20 via the side opening 261 so as to have the flange 262 of the hole 26 received in the slot 31 of the shock absorbing element 30. The mounting holes 262 that have the shock absorbing element 30 fit therein are positioned to be corresponding to the support tabs 11 of the base frame 10 so that the shock absorbing elements 30 are supported on the support tabs 11. The shock absorbing elements 30 receive the bolts 40 extending therethrough and the bolts 40 engage the threaded holes 12 of the support tabs 11 so as to at least partially secure the optic reader device 20 to the base frame 10.

In accordance with the present invention, counterweight means is provided to provide a weight balance with respect to the driving motor 21 which is arranged at one end side of the body of the optic reader device 20. The counterweight means comprises at least a primary counterweight plate 50 having a weighted section arranged at the opposite end side (referred to as weighted end side hereinafter) of the body of the optic reader device 20 with respect to the driving motor 21 and an arm 51 fixed to the weighted section extending from the weighted end side of the body to the motor end side of the body. The arm 51 comprises a plurality of threaded holes 53, preferably two respectively located in proximity of the weighed end side and the motor end side, each being corresponding to one of the mounting holes 26 of the body that have no shock absorbing element fit therein. The bolts 40 are then used to secure the arm 51 of the primary counterweight plate 50 to the body of the optic reader device 20 by extending through the holes 26 and engaging the threaded holes 53 of the arm 51. Preferably, the arm 51 is provided with a central raised section 511 extending between two ends of the arm. The raised section is bent in such a way that while the threaded holes 53 which are formed on the ends of the arm 51 are arranged to be located below the body of the optic reader device 20, the raised section 511 of the arm 51 is located above the body and in contact engagement therewith.

The arm 51 is also provided with two C-shaped holes 52 into each of which a shock absorbing element 30 that has a circumferential slot 31 is fit to have the edge of the C-shape hole 52 received into the slot 31. The C-shaped holes 52 are arranged to be corresponding to some of the support tabs 11 of the base frame 10 so as to have the shock absorbing elements 30 fit therein supported on the support tabs 11. Bolts 40 extend through the shock absorbing elements 30 and engage the threaded holes 12 of the support tabs 11 so as to secure the arm 51 to the base frame 10 which in turn partially secures the optic reader device 20 to the base frame 10 for the optic reader device 20 is mounted to the arm 51 by means of bolts 40 extending through holes 26 thereof and engaging the threaded holes 53 of the primary counterweight plate 50.

It is apparent that by means of the above arrangement, the optic reader device 20 is completely supported on the base frame 10 by the shock absorbing elements 30 so that vibration or shock may not be directly transmitted from the base frame 10 that is fixed in the CD-ROM to the optic reader device 20.

Furthermore, the addition of the counterweight plate 50 allows the center of weight of the optic reader device to be allocated at a position more close to the geometrical center of the cavity 25 of the optic reader device 20 in which the reader head 22 is moveable. This provides a more weight-balanced condition when the reader head 22 is moving in the cavity 25 and the vibration of the reader head 22 caused by imbalance distribution of weight may be alleviated and mis-reading of data is reduced.

If desired, there may one or more secondary counterweight plates 50' attached to the weighted section of the primary counterweight plate 50 by means of for example bolts 40 extending through holes 51' formed on the secondary counterweight plate 50' and engaging threaded holes 54 formed on the weighted section of the primary counterweight plate 50. The secondary counterweight plate 50' is used to adjust the center of weight of the optic reader device 20 in case that the weighted section of the primary counterweight plate 50 may not have sufficient weight. The number of the secondary counterweight plate 50' is in general not subject to any constraint.

Figure 5:
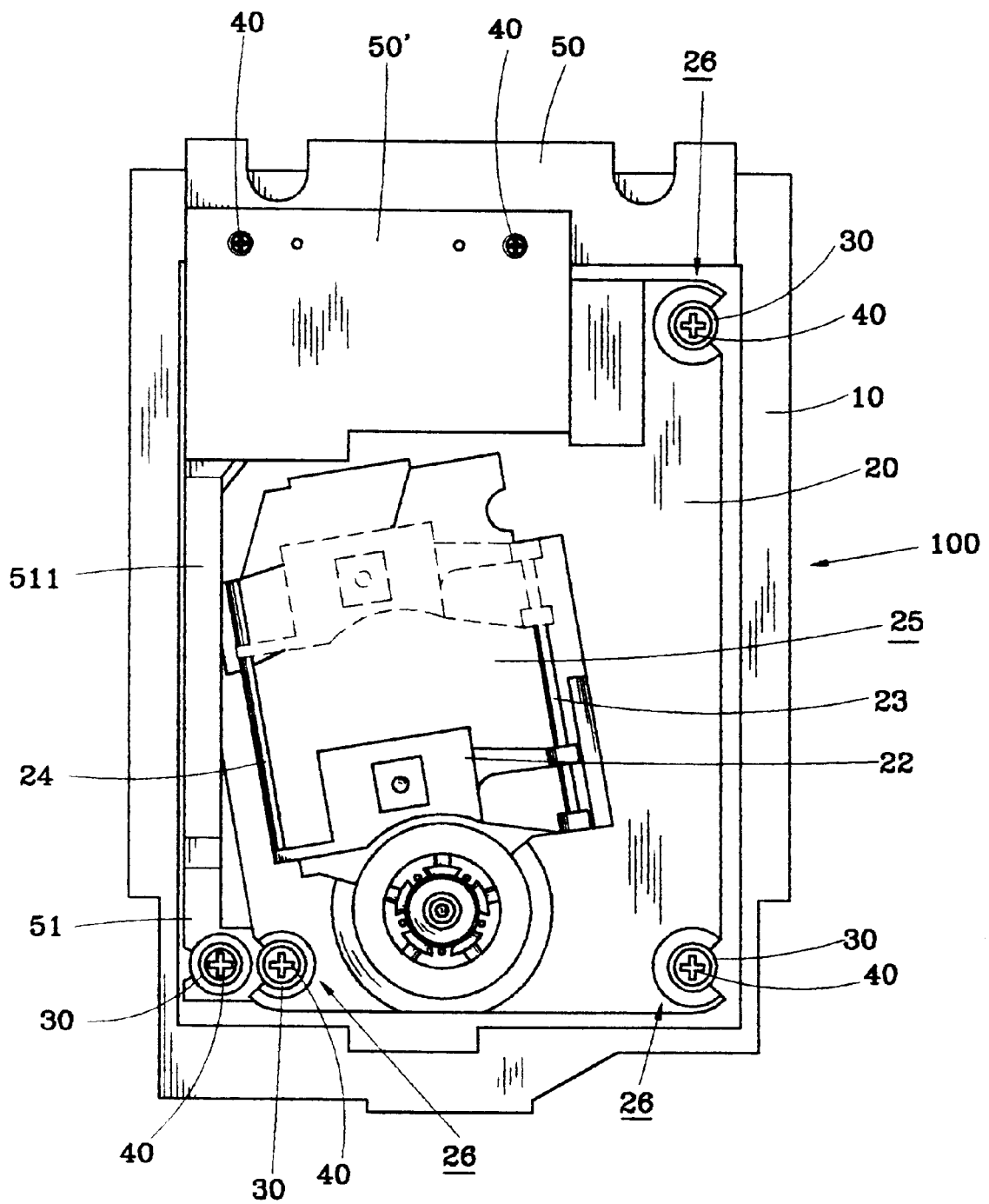
FIG. 5 is a top plan view of the CD-ROM reading mechanism showing the movement of the reader head along the guide rails.

With reference to FIG. 5, when the reader head 22 of the optic reader device 20 is moved inside the cavity 25 along the guide rails 23 and 24 between the motor side (shown in solid line) and the counterweight side (shown in phantom lines), the vibration caused by imbalance weight distribution of the body of the optic reader device 20 may be reduced for the imbalance distribution of weight that is in general caused by the geometrically offset arrangement of the driving motor 21 is now compensated by the counterweight plates 50 and 50'. Thus a more precise reading operation may be performed by the reader head 22 of the optic reader device 20.

Although a preferred embodiment has been described to illustrate the present invention, yet for those skilled in the art, it is possible to make a variety of modifications and changes to the specific embodiment without departing from the scope and spirit of the present invention. All these modifications and changes should be considered within the scope of the present invention as defined in the appended claims.

What is claimed is:

1. A shock absorbing device for a CD-ROM reading mechanism to absorb vibration/shock caused thereby, said shock absorbing device comprising:

a base frame having an interior space for receiving an optic reader device of the reading mechanism therein, said base frame including a plurality of support tabs fixed in said interior space;

a plurality of resilient shock absorbing elements mounted to the optic reader device and supported on said support tabs to provide shock buffering/absorption between said base frame and the optic reader device; and, counterweight means attached to a side of the reading mechanism adjacent an end thereof, said end being opposite to an end carrying a driving motor to provide a more balanced weight distribution of the reading mechanism, said counterweight means including a first counterweight plate having a weighted section arranged on said side of the reading mechanism and an arm extending from the weighted section to said end carrying the driving motor, said arm having ends located below the optic reader device and a central raised section extending between said ends of the reading mechanism and located above the optic reader device, said arm further having threaded holes to engage bolts that extend through holes formed in the optic reader device to secure the optic reader device to said arm.

2. The shock absorbing device as claimed in claim 1, wherein said arm has a plurality of C-shaped holes, each of said C-shaped holes having a side opening to receive and hold therein a respective one of said plurality of resilient shock absorbing elements, each of said resilient shock absorbing elements having a short cylindrical contour with a circumferential slot formed therein to receive an edge of a respective C-shaped hole of said arm, each shock absorbing element having a bolt extending therethrough and engaging a threaded hole formed in said support tab for securing said first counterweight plate and the optic reader device to said base frame.

3. The shock absorbing device as claimed in claim 2, wherein said counterweight means includes at least one second counterweight plate mounted to said weighted section of said first counterweight plate.

4. A device for providing balanced weight distribution in a CD-ROM reading mechanism, wherein the CD-ROM reading mechanism is operable to position a reader head with respect to a compact disc that is driven by a driving motor arranged at a first end side of the reading mechanism, the device comprising:

a base frame adapted to be fixed inside the CD-ROM, defining an interior space adapted to receive an optic reader device of the reading mechanism therein, the base frame comprising a plurality of support tabs fixed in the interior space thereof;

a plurality of resilient, shock absorbing elements being mounted to the optic reader device and supported on the support tabs so as to provide shock buffering/absorption between the base frame and the optic reader device; and counterweight means attached to a second end side of the reading mechanism to be opposite to the driving motor, comprising a first counterweight plate having a weighted section arranged at the second end side of the reading mechanism and an arm extending from the weighted section to the first end side of the reading mechanism, the arm having ends located below the optic reader device and a central raised section extending between the ends and located above the optic reader device to be in contact engagement therewith, the arm further comprising threaded holes to engage bolts that extend through holes formed on the optic reader device to secure the optic reader device to the arm.

5. The device as claimed in claim 4, wherein the arm comprises a plurality of C-shaped holes having a side opening to receive and hold therein a resilient, shock absorbing element which is in the form of a short cylinder having a circumferential slot to receive edge of the C-shaped hole of the arm, the shock absorbing element being supported on a support tab formed on the base frame and a bolt extending through the shock absorbing element and engaging a threaded hole formed on the support tab so as to secure the first counterweight plate and thus the optic reader device to the base frame.

6. The device as claimed in claim 4, wherein the counterweight means comprises at least one second counterweight plate mounted to the weighted section of the first counterweight plate.

* * * * *